United States Patent [19]

Silverman

[11] 3,852,456

[45] Dec. 3, 1974

[54] METHOD FOR CONTROLLING PSORIASIS

[76] Inventor: Sydney H. Silverman, 20821 Wakefield, Southfield, Mich. 48075

[22] Filed: Aug. 24, 1973

[21] Appl. No.: 391,456

[52] U.S. Cl. .............................................. 424/267
[51] Int. Cl. ........................................... A61k 27/00
[58] Field of Search .................................... 424/267

[56] References Cited
OTHER PUBLICATIONS

Chem. Abst. 8th collective Index, (Vol. 66–75), 1967–1971, p. 19123s.

*Primary Examiner*—Sam Rosen
*Attorney, Agent, or Firm*—Irving M. Weiner

[57] ABSTRACT

Psoriasis can be effectively arrested and controlled by the administration of from about 50 milligrams dosage to about 150 milligrams dosage per day of pentazocine.

6 Claims, No Drawings

METHOD FOR CONTROLLING PSORIASIS

BACKGROUND OF THE INVENTION

1. Field of the Invention

The present invention concerns the effective control and arrest of certain dermatological diseases. More specifically, the present invention relates to methods for arresting and controlling psoriasis.

2. Prior Art

Psoriasis is a dermatological disease characterized by circumscribed red patches covered with white scales. It is a chronic skin disease without having a feasible mode of control or arrest, heretofore.

Previous attempts to control and arrest psoriasis have not been fruitful. One previous proposed medical solution to controlling and arresting psoriasis involved the use of methyltrexate. However, this was deleterious to the user, by creating internal disorders, including liver damage and the like, thus, negating any utility of this proposed medical solution.

Thus, a major contribution in the art would be provided by a method for arresting and controlling psoriatic conditions.

SUMMARY OF THE INVENTION

In accordance with the present invention, psoriasis is effectively arrested and controlled by the administration of therapeutic quantities of pentazocine.

Pentazocine is a member of the benzazocine or benzomorphan series.

The therapeutic quantities of pentazocine generally range from about 50 milligrams to about 150 milligrams on a daily dosage basis.

The pentazocine is, preferably, orally ingested.

For a more complete understanding of the present invention reference is made to the following detailed description and illustrative examples.

DESCRIPTION OF THE PREFERRED EMBODIMENT

In accordance with the present invention, and as hereinbefore noted, psoriatic conditions are arrested and controlled by a method which comprises administering pentazocine in therapeutic quantities.

Pentazocine is a known compound generally prescribed for analgesic purposes. It is a member of the benzazocine or benzomorphan series.

Pentazocine is the common name for 1, 2, 3, 4, 5, 6 hexahydro-cis- 6, 11-dimethyl-3-(3-methyl-2-butenyl)-2,6-methano-3-benzazocin-8-ol.

As hereinbefore noted pentazocine is a known compound and is available commercially. In the practice of the present invention any commercially available form of pentazocine can be deployed herein with equal efficacy. However, a particularly preferred form of pentazocine is that sold commercially by Winthrop Laboratories under the trademark TALWIN.

This commercial form of pentazocine is a white crystalline substance which is soluble in aqueous acidic solutions. When administered under proper medical supervision this product produces no ill side effects as those associated with medical products heretofore prescribed for arresting and controlling psoriasis or psoriatic conditions.

As noted above, the pentazocine is administered in therapeutic quantities. Generally, a therapeutic quantity ranges from about 50 milligrams to about 150 milligrams on a daily dosage. Moreover, it has been found that in arresting psoriasis upper levels of the therapeutic quantities are employed. Thus, in arresting the psoriasis, the pentazocine is administered in an amount ranging from about 100 milligrams dosage to about 150 milligrams dosage thereof on a daily basis.

In controlling the psoriasis, the lower levels of the therapeutic quantities are employed. Thus, in controlling the psoriasis the pentazocine is administered in an amount ranging from about 50 milligrams to about 100 milligrams dosage on a daily basis.

In practicing the present invention it is preferred that the pentazocine be administered orally, such as, as a tablet or the like.

Following is an exaple of the present invention illustrating the principles hereinbefore set forth. The example is to be construed as illustrative, rather than limitative of the present invention.

EXAMPLE

A person suffering for ten years from an extremely advanced case of psoriasis began treatment for the condition with pentazocine. The pentazocine used herein was that sold commercially under the name TALWIN and in tablet form for oral administration. Each tablet contained 50 milligrams dosage of pentazocine as a hydrochloride.

For a period of sixty days the user orally ingested 150 milligrams of pentazocine on a daily basis. During this period there was a drastic reduction in the red patches associated with the psoriatic condition.

Thereafter, and for a ninety day period the quantity of pentazocine was orally administered in 100 milligrams dosages on a daily basis. The psoriatic condition continued to be alleviated with the reduction of the red patches. At the end of the 90 day period substantially all of the red patches on the user's body had disappeared.

Thereafter, the pentazocine was orally administered in a quantity of 50 milligrams on a daily basis. Continued oral administration of the compound at this level was accompanied by minor isolated appearances of the red patches evidencing the psoriatic condition.

When the daily dosage of the pentazocine was then increased again to 150 milligrams remission of the isolated red patches began again within 21 days.

Having thus described my invention what is claimed is:

1. A method for arresting and controlling psoriatic conditions in a human comprising:
administering pentazocine in therapeutic quantities.

2. The method of claim 1 wherein the pentazocine is administered in an amount ranging from about 50 milligrams to about 150 milligrams dosage on a daily basis.

3. The method of claim 1 wherein the pentazocine is administered in an amount ranging from about 100 milligrams dosage to about 150 milligrams dosage on a daily basis to arrest the psoriasis.

4. The method of claim 1 wherein the pentazocine is administered in an amount ranging from about 50 milligrams dosage to about 100 milligrams dosage on a daily basis to control the psoriasis.

5. The method of claim 1 wherein the pentazocine is administered orally.

6. The method of claim 5 wherein the pentazocine is administered orally as a tablet.

* * * * *